(12) United States Patent
Toda

(10) Patent No.: US 8,497,938 B2
(45) Date of Patent: Jul. 30, 2013

(54) IMAGE PROCESSING METHOD, IMAGE PROCESSING APPARATUS AND IMAGE PROCESSING PROGRAM

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 184 days.

(21) Appl. No.: 12/920,412

(22) PCT Filed: Mar. 18, 2009

(86) PCT No.: PCT/JP2009/055343
§ 371 (c)(1),
(2), (4) Date: Aug. 31, 2010

(87) PCT Pub. No.: WO2009/116595
PCT Pub. Date: Sep. 24, 2009

(65) Prior Publication Data
US 2011/0007210 A1    Jan. 13, 2011

(30) Foreign Application Priority Data

Mar. 21, 2008   (JP) ................................. 2008-072972

(51) Int. Cl.
*H04N 7/01*    (2006.01)
*H04N 11/20*   (2006.01)
*H04N 5/14*    (2006.01)
*G06K 9/32*    (2006.01)

(52) U.S. Cl.
USPC ........... 348/448; 348/441; 348/452; 348/701; 382/300

(58) Field of Classification Search
USPC ................................. 348/441, 448, 452, 701
See application file for complete search history.

(56) References Cited

U.S. PATENT DOCUMENTS

| 5,661,525 | A  | * | 8/1997 | Kovacevic et al. | 348/452 |
| 5,886,745 | A  | * | 3/1999 | Muraji et al.    | 348/448 |
| 5,943,099 | A  | * | 8/1999 | Kim              | 348/448 |
| 6,335,734 | B1 | * | 1/2002 | Nagae et al.     | 345/589 |
| 6,577,345 | B1 | * | 6/2003 | Lim et al.       | 348/452 |
| 6,795,123 | B2 | * | 9/2004 | Gotanda et al.   | 348/448 |

(Continued)

FOREIGN PATENT DOCUMENTS

| JP | 04-355581   | 12/1992 |
| JP | 2000-050212 | 2/2000  |

(Continued)

OTHER PUBLICATIONS

International Search Report, PCT/JP2009/055343, Jun. 23, 2009.

(Continued)

*Primary Examiner* — Brian Yenke
(74) *Attorney, Agent, or Firm* — Young & Thompson

(57) ABSTRACT

An image-processing method determines the interpolation reliability for interpolated pixels in a progressive image, generated by interpolation of an interlaced image, by combining at least any of a first interpolation reliability determined based on the absolute value of the difference between pixels in an upper line and pixels in a lower line used to calculate the value of the interpolated pixels, a second interpolation reliability determined based on the width of the region used to determine the pixels in the upper line and the pixels in the lower line used to calculate the value of the interpolated pixels, and a third interpolation reliability determined by combining the change in luminance for the upper line and the change in luminance for the lower line within the region.

19 Claims, 9 Drawing Sheets

U.S. PATENT DOCUMENTS

| | | | | |
|---|---|---|---|---|
| 6,943,807 B2* | 9/2005 | Xavier | | 345/606 |
| 6,980,254 B1* | 12/2005 | Nishihashi et al. | | 348/452 |
| 7,012,649 B2* | 3/2006 | Michel | | 348/448 |
| 7,142,247 B2* | 11/2006 | Jung | | 348/452 |
| 7,193,655 B2* | 3/2007 | Nicolas | | 348/448 |
| 7,518,655 B2* | 4/2009 | Fazzini | | 348/448 |
| 8,081,256 B2* | 12/2011 | Lertrattanapanich et al. | | 348/448 |
| 8,107,773 B2* | 1/2012 | Hori et al. | | 382/300 |
| 8,144,248 B2* | 3/2012 | Sato | | 348/452 |
| 2002/0093587 A1* | 7/2002 | Michel | | 348/452 |
| 2003/0156301 A1* | 8/2003 | Kempf et al. | | 358/486 |
| 2004/0160439 A1* | 8/2004 | Xavier | | 345/419 |
| 2004/0207753 A1* | 10/2004 | Jung | | 348/452 |
| 2004/0252232 A1* | 12/2004 | Lodder et al. | | 348/448 |
| 2004/0257467 A1* | 12/2004 | Nicolas | | 348/452 |
| 2005/0169557 A1* | 8/2005 | Xavier | | 382/300 |
| 2005/0270418 A1 | 12/2005 | Kondo et al. | | |
| 2008/0080790 A1* | 4/2008 | Hori et al. | | 382/300 |
| 2011/0249141 A1* | 10/2011 | Chen et al. | | 348/223.1 |

FOREIGN PATENT DOCUMENTS

| | | |
|---|---|---|
| JP | 3677165 | 7/2005 |
| JP | 2005-333254 | 12/2005 |
| WO | WO 2006/126169 | 11/2006 |

OTHER PUBLICATIONS

Masato Toda, Masato Tsukada, Akira Inoue, "Shuhen Ryoiki no Kido Henka ni Motozuku Edge Tekiogata Interlace-Progressive Henkanho" Dai 6 Kai Forum on Information Technology, Aug. 22, 2007, vol. FIT 2007 Ippan Koen Ronbunshu separate vol. 3, pp. 271 to 272.

"Deinterlacing-an overview", De Haan, G., Bellers, E.B., Proceedings of the IEEE, vol. 86, Issue 9, Sep. 1998 pp. 1839-1857.

* cited by examiner

IMAGE PROCESSING METHOD, IMAGE PROCESSING APPARATUS AND IMAGE PROCESSING PROGRAM

TECHNICAL FIELD

The present invention relates to an image processing method, an image processing apparatus, and an image processing program, each which generates progressive images through the interlace to progressive conversion.

BACKGROUND OF THE RELATED ART

Videos distributed via TV broadcast and videos stored on recording media, such as video tapes, DVDs, or the like, are often interlaced videos. The interlaced image Fi is an image decimated every other line in the image scanning direction, as represented by the equation (1), different from the progressive image Fp.

[Equation 1]

$$Fi(x, y) = \begin{cases} Fp(x, y) & \text{if } (y \bmod 2 = 0) \\ \text{Null} & \text{else} \end{cases} \quad (1)$$

or $$Fi(x, y) = \begin{cases} Fp(x, y) & \text{if } (y \bmod 2 = 1) \\ \text{Null} & \text{else} \end{cases}$$

where Fi(x, y) and Fp(x, y) represent pixel values Fi and Fp in the coordinate (x, y), respectively. X mod y is an arithmetic symbol representing a remainder of x/y.

When an image display unit, such as LCD or plasma display, that manifests progressive images, displays interlaced images or when the image collating unit that compares an input progressive image with a corresponding progressive image stored preliminarily in a database and recognizes the progressive image, receives interlaced images, Null pixels on lines decimated in the interlaced images, represented by the equation (1), have to be restored via interpolation to generate a progressive video. This interpolation process is generally called as the interlacing to progressive conversion (IP conversion, De-interlacing). Hereinafter, Null pixels to be interpolated are called as interpolated pixels.

As one of IP converting methods is cited the method using the peripheral pixel information for the interpolation of the Null pixel on the coordinate (x1, y1) within Fi. As that method, there are the simple linear interpolation method represented by the equation (2) and the edge adaptive interpolation method (non-patent document 1 and patent document 1) represented by the equation (3). However, Fp2 is a progressive video generated through the above interpolation method and Fp2(x,y) is a pixel value Fp2 on the coordinate (x,y). m in the equation (3) corresponds to p minimizing the formula (4) within the preliminarily determined range $-\Phi \leq p \leq \Phi$. Hereinafter, the range $(-\Phi \leq p \leq \Phi)$ is called as a search range and the numerical value $\Phi$ is called as a search range decision value.

Moreover, referring to the non-patent document 2, the change in luminance of the upper and lower lines within a search range by the edge adaptive interpolation method for respective interpolation pixels are classified into five patterns based on the luminance conversion of peripheral pixels, as shown in FIG. 7. Five patterns are (1) one characteristic being flat, (2) both characteristics increasing and decreasing monotonously in the same direction, (3) both characteristics being curved convexly in the same direction, (4) one characteristic decreasing and increasing and the other being curved convexly, and (5) others. The search range decision value $\Phi$ changes adaptively such that the pattern of a luminance change of the upper or lower lines within a search range belongs to any one of the patterns (1) to (4) and such that the maximum range is a search range. Hereinafter, luminance change patterns of upper and lower lines within a classified search range are called as luminance change patterns of upper and lower lines.

[Equation 2]

$$Fp2(x1, y1) = \frac{Fi(x1, y1-1) + Fi(x1, y1+1)}{2} \quad (2)$$

[Equation 3]

$$Fp2(x1, y1) = \frac{Fi(x1-m, y1-1) + Fi(x1+m, y1+1)}{2} \quad (3)$$

[Equation 4]

$$Sub(p) = |Fi(x1-p, y1-1) - Fi(x1+p, y+1)| \quad (4)$$

As for IP conversion, it is generally known that interpolating all Null pixels correctly is difficult. That is, that remark means that the progressive image generated via the IP conversion contains pixels interpolated erroneously (hereinafter, interpolated pixels).

As to image processing application apparatuses, such as video display units or image collating units, that utilize progressive images mentioned above, the problem is that the processing performance due to erroneously interpolated pixels contained in a progressive image is degraded. In order to prevent such problem, the above-mentioned technique includes the steps of calculating the interpolation reliability for each interpolated pixel, based on difference absolute values of a pixel utilized for interpolation, and performing image processing according to the interpolation reliability in the image processing application. Hereinafter, the difference absolute value of a pixel used for interpolation is called as an interpolated difference value.

For example, the patent document 2 discloses the image processing application apparatus that performs the motion adaptive IP conversion, which synthesizes a progressive image interpolated from one interlaced image at a current time and an interlaced image at other time according to the previously described method, using still/motion discrimination, to display progressive images interpolated at higher precision. In such image processing application apparatus, the process changing is executed with the interpolation reliability, as one factor, calculated based on the interpolation difference value. The calculation is carried out in such way that the interpolation reliability has a larger value when the interpolation difference value is small and has a smaller value when the interpolation difference value is large.

Referring to FIG. 9, the image processing apparatus will be explained below that generates progressive images through IP conversion in the technology related to the present invention and outputs them and their interpolation reliabilities. FIG. 9 is a block diagram illustrating the configuration of an image processing apparatus that generates progressive images in the technology related to the present invention and calculates interpolation reliabilities thereof.

Referring to FIG. 9, the image processing apparatus 100 includes an image interpolation means 11 and an interpolation reliability calculation means 12. The image processing apparatus 100 receives interlaced images and outputs progressive images and their interpolation reliabilities to an image processing application apparatus 400, such as video display unit or image collating unit.

The image interpolation means 11 receives an interlaced image and interpolates it via the method, previously described, and generates a progressive image while outputting an interpolation difference value for each pixel.

The interpolation reliability calculation means 12 receives an interpolation difference value for each pixel output from the image interpolation means 11 and calculates and outputs the interpolation reliability in accordance with the interpolation difference value.

Patent document 1: Japanese patent Laid-open publication No. Hei4-355581

Patent document 2: Japanese patent Laid-open publication No. 2000-50212

Non-patent document 1: "Deinterlacing-an overview", De Haan, G, Betters, E. B, Proceedings of the IEEE, Volume 86, Issue 9, September 1998 page(s): 1839-1857

Non-patent document 2: "Edge adaptive interlace to progressive conversion method based on a change in luminance around peripheral area", Toda et al., Sixth information Science Technology Forum, 1-034, 2007

DISCLOSURE OF THE INVENTION

Problems to be Solved by the Invention

However, the related technology described above uses an interpolation difference value to calculate the interpolation reliability but cannot obtain the interpolation reliability correctly by merely using only information about interpolation difference values.

In either the case where the interested interpolated pixel on the upper side in FIG. 8 is coupled to upper and lower pixels, as shown on the lower layer in FIG. 8, for white interpolation or the case when black pixels are coupled in an oblique direction are coupled for black interpolation, the interpolation difference value becomes 0. As a result, the interpolation reliability becomes maximum. However, in the case of the coupling of an area and interpolation to white, since a black pixel on the upper right of interpolated pixels is isolated, the related art is not proper. For that reason, it is desirable that the interpolation reliability of an interested interpolated pixel has a smaller value is in interpolation for white, compared with interpolation for black. However, in the related technique depending on only the interpolation difference value, the interpolation reliability has the same maximum value even in white interpolation and black interpolation. Therefore, when the related technique is used, the processing performance of an image processing application apparatus may deteriorate.

As described above, the related technology above mentioned has the problem regarding to the interpolation reliability to be calculated, thus leading to troubles to the processing performance in image processing application apparatuses and image processing programs. As a result, the related technology cannot provide a satisfactory image processing method, apparatus or program.

The present invention is made in view of the above mentioned problems. The object of the present invention is to provide an image processing method, an image processing apparatus, and an image processing program, each which can calculate the interpolation reliability upon the interlace to progressive conversion at high accuracy.

Means to Solve the Problems

In order to solve the above mentioned problems, according to the present invention, an image processing method comprises the step of determining an interpolation reliability of interpolated pixels in a progressive image generated by interpolating an interlaced image, by integrating at least any of a first interpolation reliability, a second interpolation reliability, and a third interpolation reliability, the first interpolation reliability being determined based on difference absolute values between pixels on an upper line and pixels on a lower line, used to calculate pixel values to be interpolated, the second interpolation reliability being determined based on the width of an area used to determine pixels on an upper line and pixels on a lower line, used to calculate the pixel values to be interpolated, the third interpolation reliability being determined by combining a change in luminance of an upper line and a change in luminance of a lower line within the area.

According to the present invention, an image processing method comprises an image interpolation step of interpolating interlaced images and generating progressive images; at least one of a first interpolation reliability calculation step, a second interpolation reliability calculation step, and a third interpolation reliability calculation step, the first interpolation reliability calculation step calculating a first interpolation reliability of an interpolation pixel to be determined based on a difference absolute value between pixels of an upper line and pixels of a lower line used to calculate a pixel value to be interpolated, the second interpolation reliability calculation step calculating a second interpolation reliability of an interpolation pixel to be determined based on the width of an area used to determine pixels of an upper line and pixels of a lower line used to calculate the pixel value to be interpolated, the third interpolation reliability calculation step calculating a third interpolation reliability of an interpolation pixel to be determined based on a combination pattern a change in luminance of an upper line and a change in luminance of a lower line in the area, and an interpolation reliability integration step of integrating at least any of the first interpolation reliability, the second interpolation reliability, and the third interpolation reliability, and thus calculating the interpolation reliability of an interpolation pixel.

According to the present invention, an image processing apparatus comprises at least any of a first interpolation reliability calculation means, a second interpolation reliability calculation means, and a third interpolation reliability calculation means, the first interpolation reliability calculation means calculating a first interpolation reliability of an interpolated pixel determined based on a difference absolute value between pixels of an upper line and pixels of a lower line, used to calculate an interpolated pixel value of a progressive image generated by interpolating an interlaced image, the second interpolation reliability calculation means calculating a second interpolation reliability of an interpolated image to be determined based on the width of an area used to determine pixels on an upper line and pixels on a lower line, used to calculate the interpolated pixel value, the third interpolation reliability calculation means calculating a third interpolation reliability of an interpolated pixel to be determined based on a combination pattern of a change in luminance on an upper line and a change in luminance on a lower line within the area; and an interpolation reliability integration means for integrating at least any of the first interpolation reliability, the second interpolation reliability, and the third interpolation reliability and thus calculating an interpolation reliability of an interpolated pixel.

According to the present invention, a program directs an information processing apparatus to execute the process including at least any of a first interpolation reliability calculation process, a second interpolation reliability calculation process, and a third interpolation reliability calculation process, the first interpolation reliability calculation process calculating a first interpolation reliability of an interpolated image to be determined based on a difference absolute value between pixels of an upper line and pixels of a lower line used to calculate an interpolated pixel value of a progressive image generated by interpolating an interlaced image, the second interpolation reliability calculation process calculating a second interpolation reliability of an interpolated pixel to be determined based on the width of an area used to determine pixels of an upper line and pixels of a lower line used to calculate the interpolated pixel value, the third interpolation reliability calculation process calculating a third interpolation reliability of an interpolated pixel to be determined based on a combination pattern of a luminance change of an upper line and a luminance change of a lower line in the area; and an interpolation reliability integration process of integrating at least any of the first interpolation reliability, the second interpolation reliability, and the third interpolation reliability, to calculate the interpolation reliability of an interpolation pixel.

Effect of the Invention

An advantageous effect of the present invention is that the interpolation reliability upon an interlace-to-progressive conversion can be calculated in high accuracy.

BEST MODE FOR CARRYING OUT THE INVENTION

<First Embodiment>

A first embodiment of the present invention will be explained below in detail referring to the attached drawings.

Figure 1:
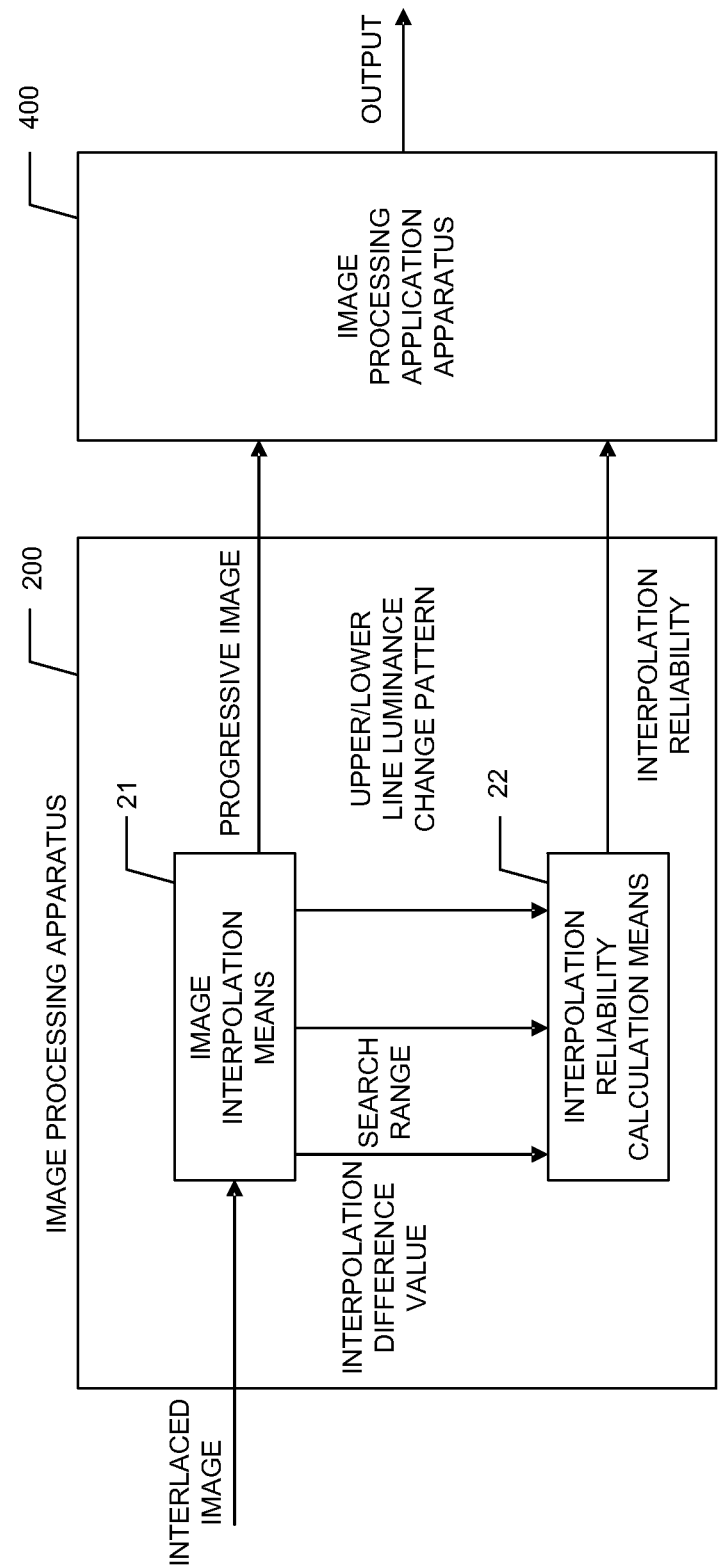
FIG. 1 is a block diagram illustrating a best mode configuration for carrying out a first invention.

FIG. 1 is a block diagram illustrating an image processing apparatus according to the first embodiment of the present invention. Referring to FIG. 1, the image processing apparatus 200, which is the first embodiment of the present invention, includes an image interpolation means 21 and an interpolation reliability calculation means 22.

The image interpolation means 21 receives an interlaced image and then generates a progressive image using the method disclosed in, for instance, the non-patent document 2. According to the method in the non-patent document 2, patterns of changes in luminance on upper and lower lines are calculated based on changes in luminance around interpolated pixels and obtains an optimum search range, then performing the edge adaptive interpolation. In addition to an interpolated progressive image and an interpolation difference value for each interpolated pixel, which are outputs in the related method, the image interpolation means 21 produces a luminance change patterns of upper and lower lines and a search range, for each interpolated pixel, obtained in the method disclosed in the non-patent document 2.

Figure 2:
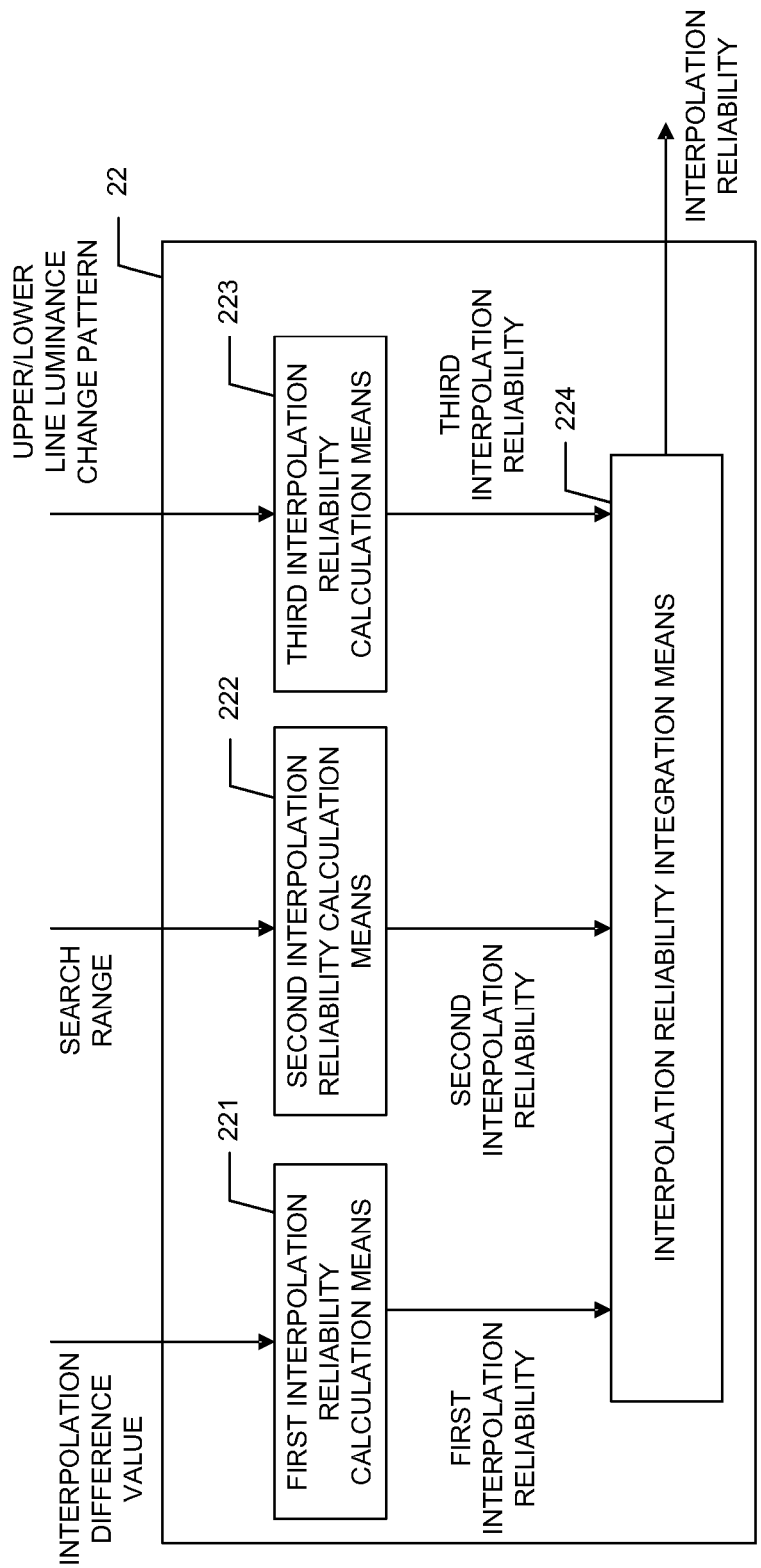
FIG. 2 is a block diagram illustrating in detail the configuration of an interpolation reliability calculation means 22 in the first invention.

The interpolation reliability calculation means 22 receives an interpolation difference value, a search range, and a luminance change pattern of an upper and lower lines within a search range, for each interpolated pixel, and calculates and outputs an interpolation reliability for each interpolated pixel. Referring to FIG. 2, the interpolation reliability calculation means 22 includes a first interpolation reliability calculation means 221, a second interpolation reliability calculation means 222, a third interpolation reliability calculation means 223, and an interpolation reliability integration means 224.

The first interpolation reliability calculation means 221 receives an interpolation difference value for each interpolated pixel and calculates and outputs a first interpolation reliability, which means the interpolation reliability obtained based on the interpolation different value. Utilizing the procedure similar to that of the interpolation reliability calculation means 12 in the related technology, the operation of the first interpolation reliability calculation means 221 is to output a first interpolation reliability, which has a larger value when an interpolation difference value is small or which has a smaller value when an interpolation difference value is large.

An example of the first interpolation reliability calculating method will be explained below. The first interpolation reliability $p1(x2, y2)$ for the interpolation pixel $(x2, y2)$ is calculated from the interpolation difference value $s(x2, y2)$, using the equation (5).

[Equation 5]

$$p1(x2, y2) = \begin{cases} T1 - \\ (1-p10)\frac{s(x2, y2)}{T1} + p10 & \text{if } (s(x2, y2) \leq T1) \\ p10 & \text{else} \end{cases} \quad (5)$$

where T1 and $p10 (0 \leq p10 \leq 1.0)$ are parameters given preliminarily and manually, respectively.

Moreover, the method may be also utilized of preparing a table which preliminarily lists interpolation difference values associated with first interpolation reliabilities, referring to the table and thus reading out the first interpolation reliability corresponding to the input interpolation difference value $s(x2,y2)$.

The second interpolation reliability calculation means 222 will be explained below.

Executing the edge adaptive interpolation to the interlaced image over a broad search range means executing interpolation using more information. Executing the edge adaptive interpolation over a narrow search range means executing interpolation using less information. In the feature of the edge adaptive interpolation method, for example, disclosed in the non-patent document 2, when the edge adaptive interpolation is executed over a broad search range, a change in luminance around interpolated pixels becomes monotonous. Hence, it is easy to execute accurate interpolation. When the edge adaptive interpolation is executed over a narrow search range, a change in luminance around interpolated pixels becomes complicated. Hence, the edge adaptive interpolation method is difficult comparatively to execute accurate interpolation. That is, when the interpolation process is executed over a broad search range, the interpolation reliability is high. When the interpolation process is executed over a narrow search range, the interpolation reliability is low.

The present invention notes the correlation characteristic of the size of the search range to the interpolation reliability. The second interpolation reliability calculation means 222 outputs the second interpolation reliability, which has a larger value when the search range is broader and which has a smaller value when the search range is narrower.

For the interpolated pixel (x2, y2), the second interpolation reliability p2(x2, y2) is calculated based on the search range decision value Φ(x2, y2) in the interpolated pixel (x2, y2), using the equation (6).

[Equation 6]

$$p2(x2, y2) = \begin{cases} (1-p20)\frac{\phi(x2, y2)}{T2} + p20 & \text{if } (\phi(x2, y2) \leq T1) \\ 1.0 & \text{else} \end{cases} \quad (6)$$

where T2 and p20 (0≦p20≦1.0) are parameters given preliminarily and manually.

Moreover, the method may be utilized of preliminarily preparing a table arranging search ranges and a second interpolation reliability, associated with each other, referring to the table, and reading out the second interpolation reliability corresponding to the input search range Φ(1x2, y2).

The third interpolation reliability calculation means 223 receives luminance change patterns of upper and lower lines within a search range for each interpolated pixel and outputs a third interpolation reliability calculated based on the luminance change patterns.

When the luminance change on the periphery of an interpolated pixel is monotonous, an interlaced image can be interpolated more accurately and more easily. When the luminance change on the periphery of an interpolated pixel is complex, it is more difficult to interpolate an interlaced image accurately. Moreover, an interlaced image can be interpolated more accurately and more easily when the luminance changes of upper and lower lines resembles. It is difficult to interpolate an interlaced image more accurately and more easily when the luminance changes of upper and lower lines are different from each other.

Figure 7:
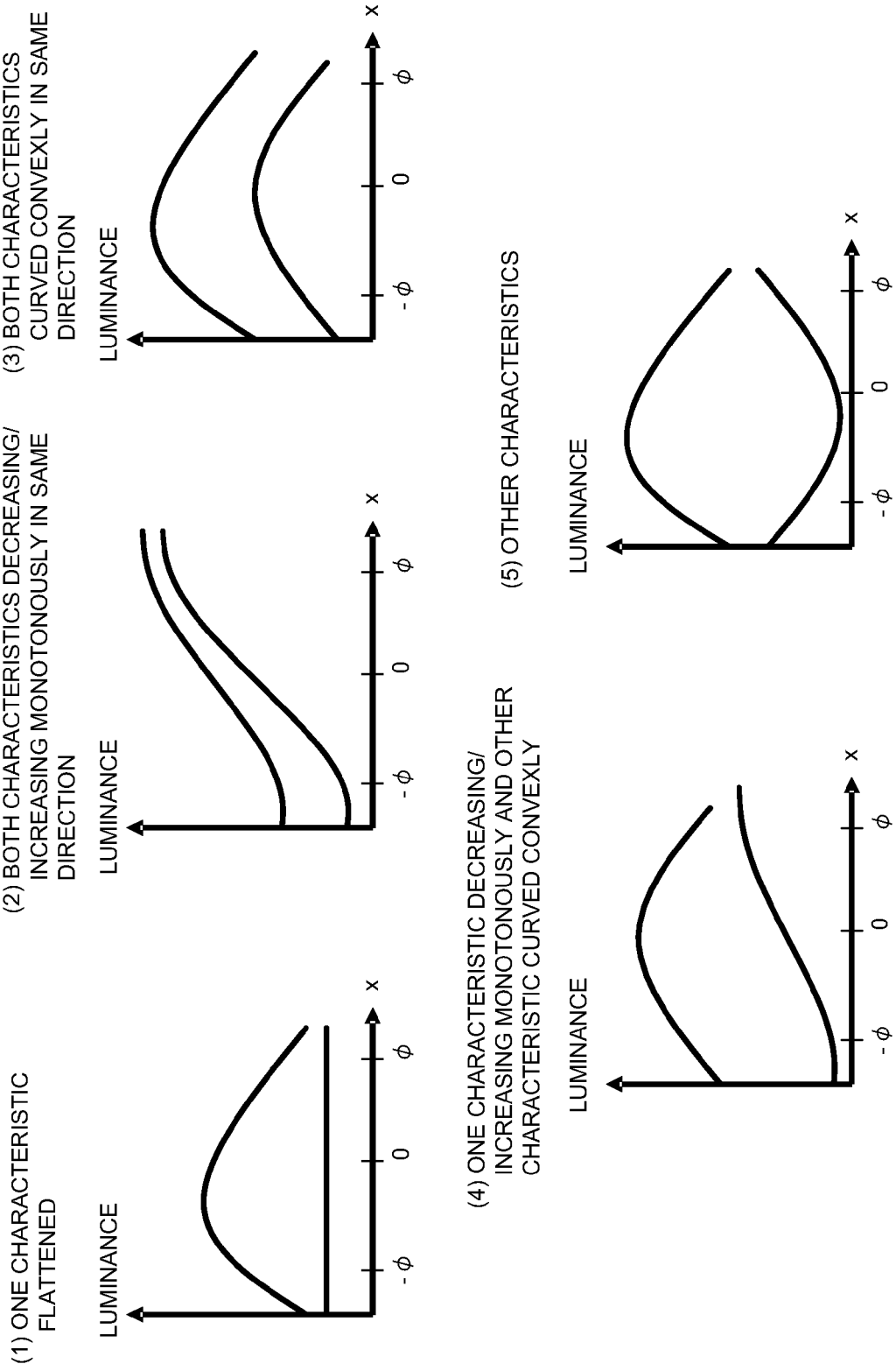
FIG. 7 is a diagram explaining patterns representing changes in luminance on upper and lower lines.
Figure 8:
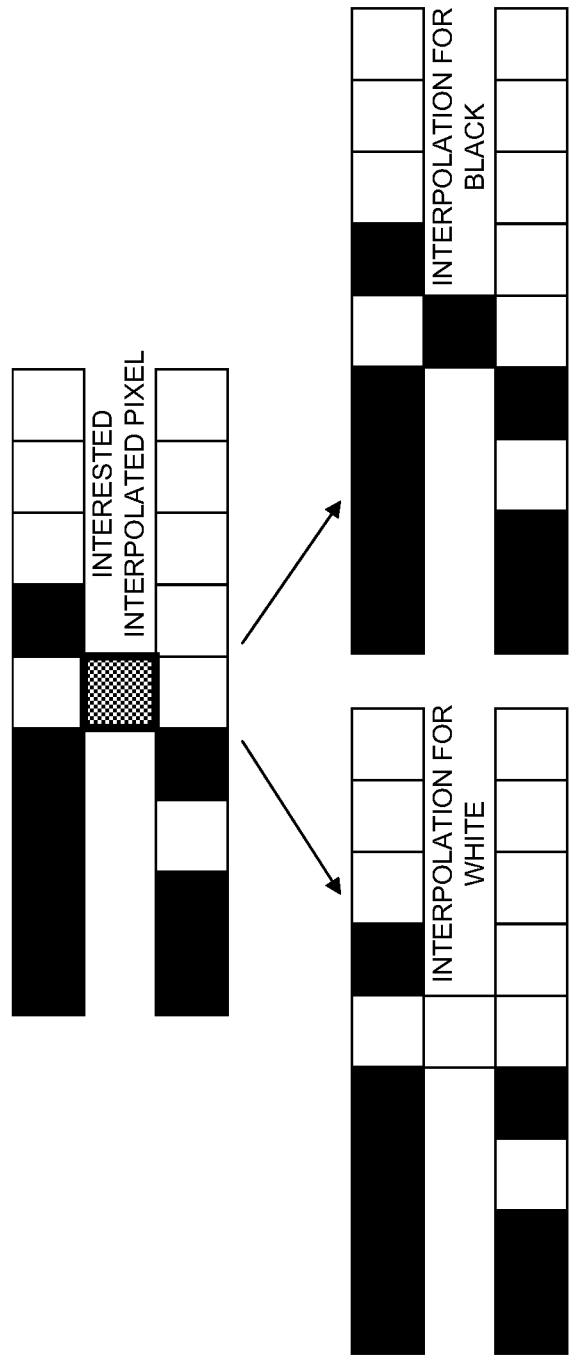
FIG. 8 is a diagram supplementally illustrating problems in the related technology.
Figure 9:
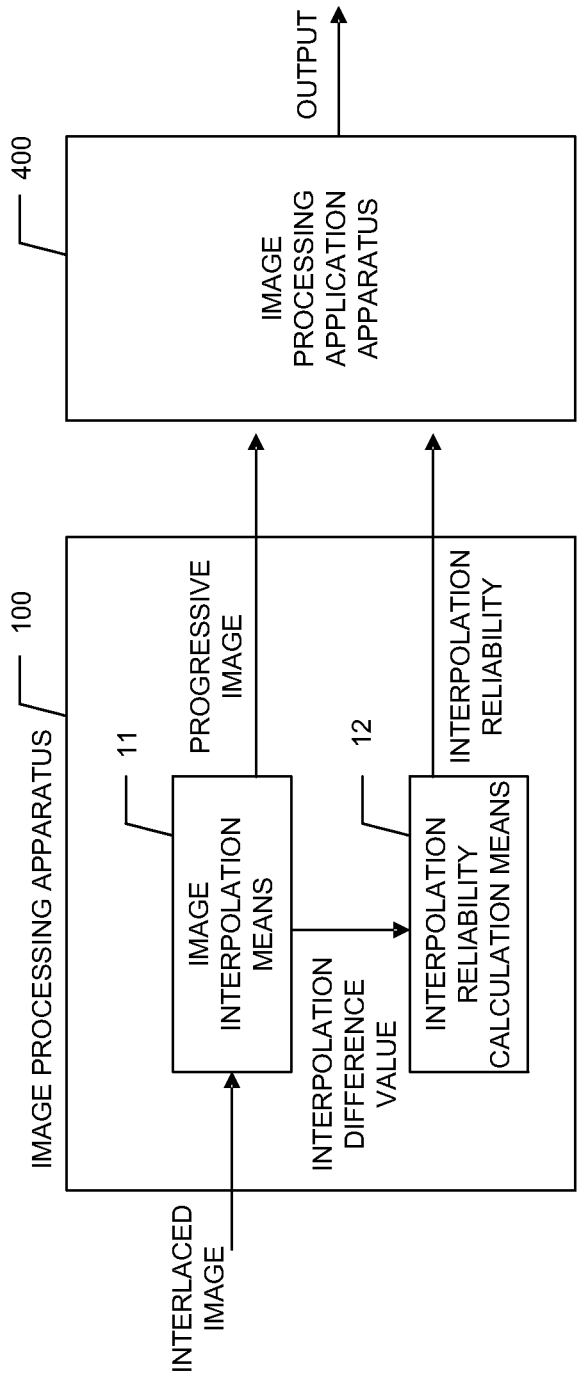
FIG. 9 is a block diagram illustrating the configuration of the related technology.

The present invention notices that there is a correlation characteristic between the luminance change patterns of the upper and lower lines and the interpolation reliability. The third interpolation reliability calculation means 223 outputs a third interpolation reliability for four luminance change patterns classified as shown in FIG. 7, based on the luminance change patterns of upper and lower lines. The third interpolation reliability has a value of (a third interpolation reliability when one characteristic is flat)≧(a third interpolation reliability when the characteristic increases and decreases monotonously in the same direction)≧(a third interpolation reliability when the characteristic is curved convexly in the same direction)≧(an interpolation reliability when one characteristic increases or decreases and the other characteristic is curved convexly).

In one method of obtaining the third interpolation reliability p3(x2, y2) based on the luminance change patterns k(x2, y2) of upper and lower lines for the interpolated pixel (x2, y2), a table is prepared preliminarily arranging luminance change patterns of upper and lower lines associated with the third interpolation reliability. By referring to the table, the third interpolated reliability corresponding to the luminance change pattern k(1x2, y2) of input upper and lower lines is read out. The table on which luminance change patterns of upper and lower lines are associated with the third interpolation reliability may be adjusted externally.

The interpolation reliability integration means 224 receives the first interpolation reliability output from the first interpolation reliability calculation means 221, the second interpolation reliability output from the second interpolation reliability calculation means 222, and the third interpolation reliability output from the third interpolation reliability calculation means 223 and calculates an interpolation reliability, thus sending it to the interpolation reliability calculation means 22.

In one method of obtaining the interpolation reliability p(x2, y2) of the interpolated pixel (x2, y2), the interpolation reliability p(x2, y2) is obtained by substituting the first interpolation reliability p1(x2, y2) of (x2, y2), the second interpolation reliability p2(x2, y2) of (x2, y2) and the third interpolation reliability p3(x2, y2) of (x2, y2) in the equation (7).

[Equation 7]

$$p(x2, y2) = p1(x2, y2)p2(x2, y2)p3(x2, y2) \quad (7)$$

The interpolation reliability may be obtained through weighted mean of p1(x2, y2), p2(x2, y2) and p3(x2, y2), as shown in the equation (8).

[Equation 8]

$$p(x2, y2) = \frac{w1\,p1(x2, y2) + w2\,p2(x2, y2) + w3\,p3(x2, y2)}{w1 + w2 + w3} \quad (8)$$

where w1, w2, and w3 real synthesis weight coefficients and may be fixed values set preliminarily or may be adjusted externally.

As described above, the image processing apparatus 200 receives interlaced images and outputs progressive images and interlaced reliabilities, which are input to the rear stage, such as the image processing application apparatus 400 that realizes, for example, resolution conversion.

Figure 3:
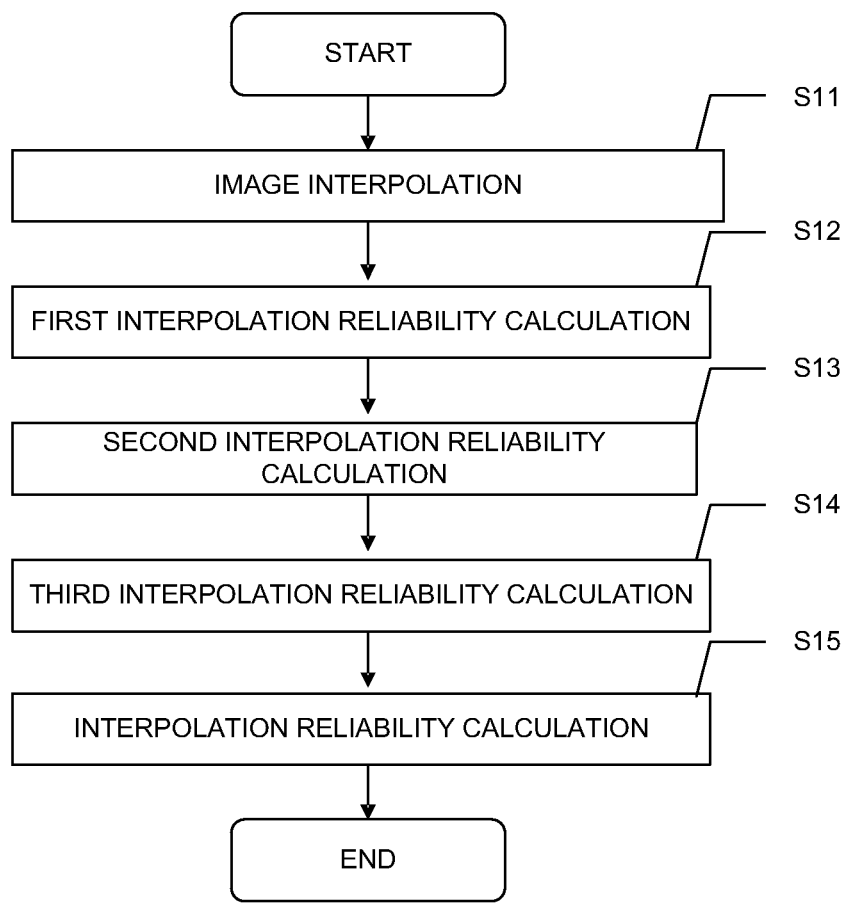
FIG. 3 is flow chart illustrating the operation in a best mode for carrying out the first invention.

Next, the operation of an image processing method, which is the first embodiment of the present invention, will be explained below, by referring to the flowchart in FIG. 3.

An interlaced image is input and interpolated and thus a progressive image is generated (step S11).

The first interpolation reliability is obtained from an interpolation difference value through the first interpolation reliability calculation (step S12).

The second interpolation reliability is obtained from the size of the search range through the second interpolation reliability calculation (step S13).

The third interpolation reliability is obtained from luminance change patterns of upper and lower lines within a search range through the third interpolation reliability calculation (step S14).

In the interpolation reliability calculation, the interpolation reliability of an interested interpolated pixel is obtained from the first interpolation reliability, the second interpolation reliability and the third interpolation reliability (step S15).

<Second Embodiment>

The second embodiment will be explained below.

Figure 4:
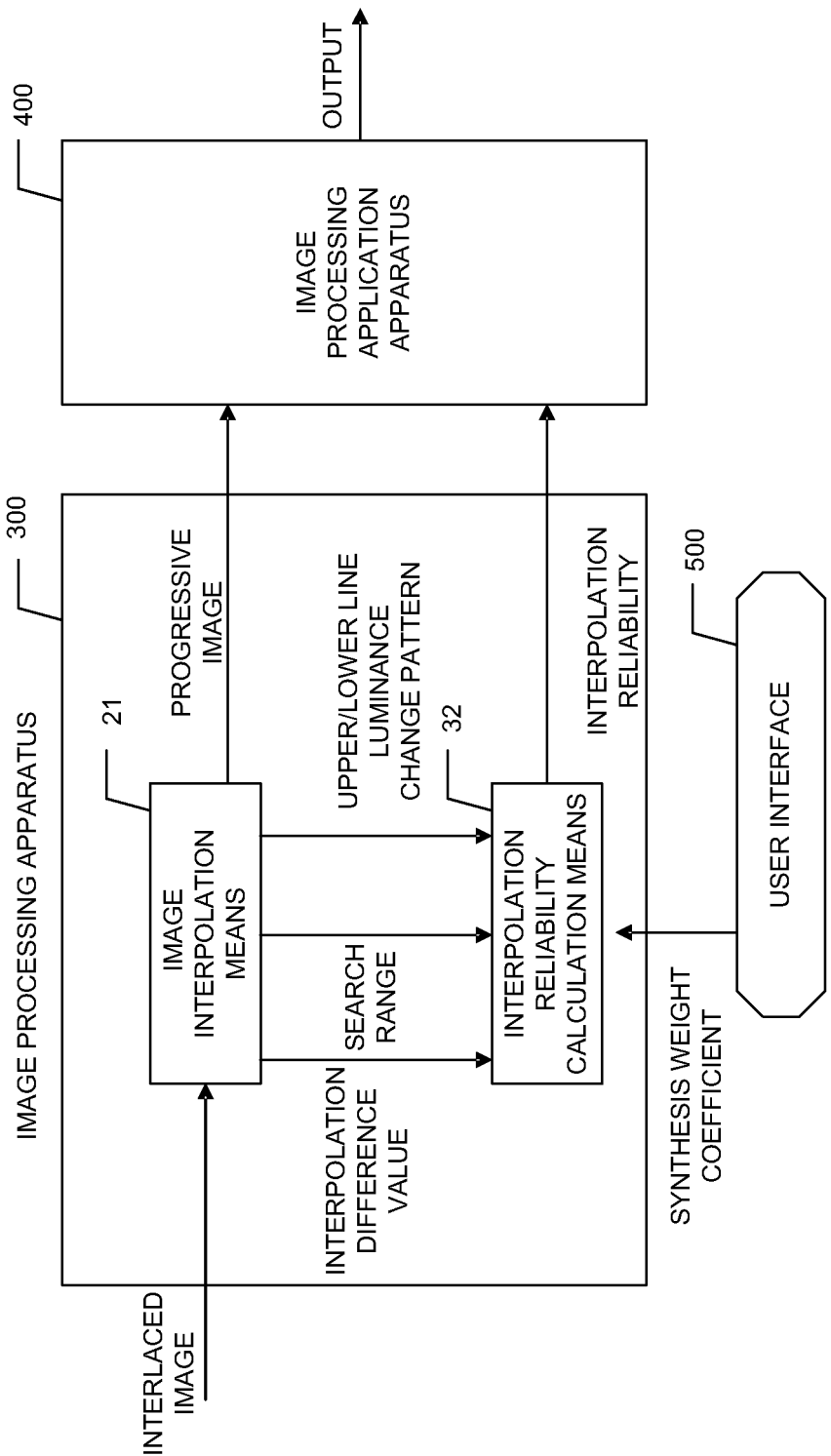
FIG. 4 is a block diagram illustrating a best mode configuration for carrying out a second invention.

FIG. 4 is a block diagram illustrating an image processing apparatus according to the second embodiment of the present invention. Referring to FIG. 4, the image processing apparatus 300, which is the second embodiment of the present invention, includes an image interpolation means 21 and an interpolation reliability calculation means 32. The image processing apparatus 300, which is the second embodiment of the present invention, differs from the image processing apparatus 200, which is the first embodiment of the present invention, in the operation of the interpolation reliability calculation means 32. The interpolation reliability calculation means 32 will be explained below in detail.

Figure 5:
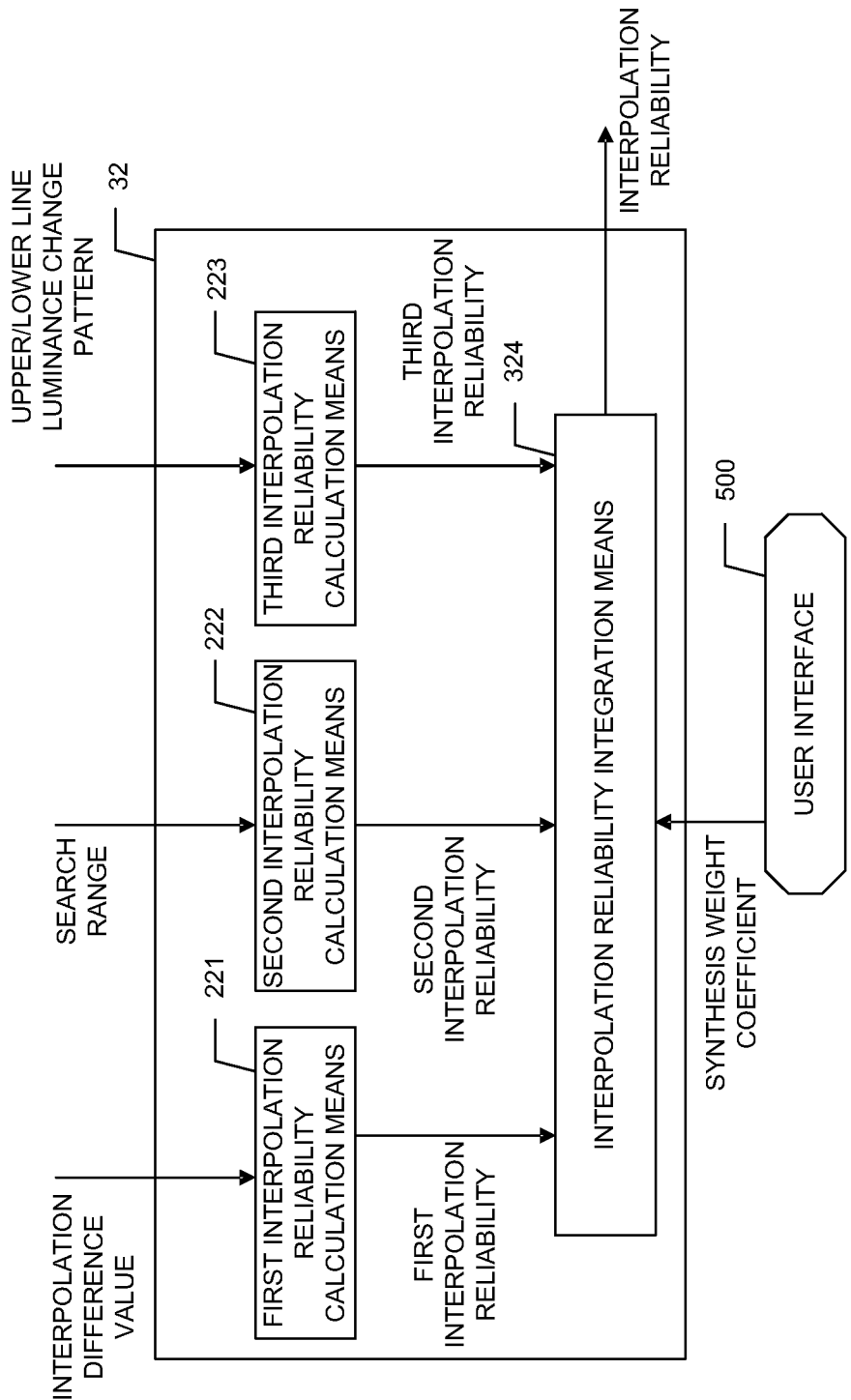
FIG. 5 is a block diagram illustrating in detail the configuration of an interpolation reliability calculation means 32 in the second invention.

Referring to FIG. 5, the interpolation reliability calculation means 32 includes a first interpolation reliability calculation means 221, a second interpolation reliability calculation means 222, a third interpolation reliability calculation means 223, and an interpolation reliability integration means 324. The interpolation reliability calculation means 32 differs from the interpolation reliability calculation means 22 in the image processing apparatus 200 according to the first embodiment of the present invention, in that a user interface 500 inputs the synthesis weight coefficient given by the equation (8) for the interpolation reliability integration means 224 to the interpolation reliability integration means 324.

The image processing apparatus 300, according to the second embodiment of the present invention, sets the synthesis weight coefficient in the interpolation reliability integration means 324 via the user interface 500. For that reason, the synthesis weight coefficient can be adjusted easily.

Figure 6:
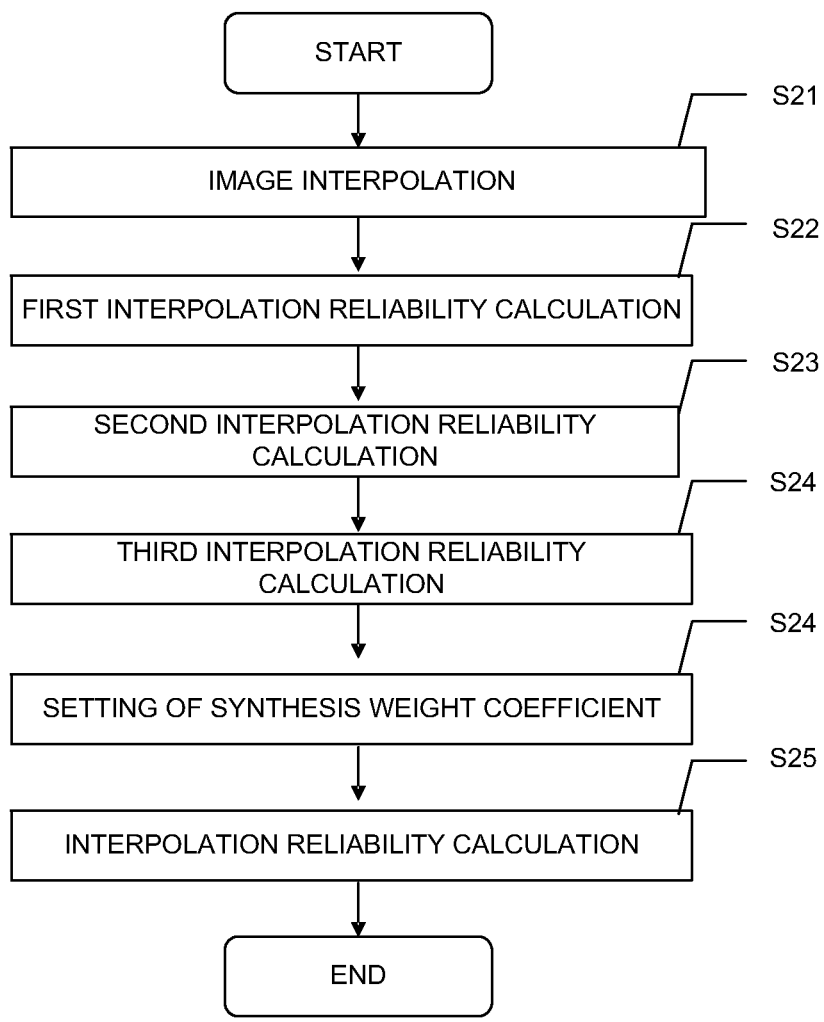
FIG. 6 is flow chart illustrating the operation in a best mode for carrying out a fourth invention.

Next, the operation of an image processing method according to the second embodiment of the present invention will be explained below by referring to FIG. 6.

An interlaced image is input and interpolated to generate a progressive image (step S21).

In the first interpolation reliability calculation, the first interpolation reliability is calculated based on an interpolation difference value (step S22).

In the second interpolation calculation, the second interpolation reliability is calculated based on the width of a search range (step S23).

In the third interpolation reliability calculation, the third interpolation reliability is calculated based on luminance change patterns of upper and lower lines within a search range (step S24).

The synthesis weight coefficient value is set to a value designated by the user interface (step S25).

In the interpolation reliability calculation, the interpolation reliability of an interested interpolated pixel is calculated based on the first interpolation reliability, the second interpolation reliability, and the third interpolation reliability (step S26).

In the image processing apparatus according to the first and second embodiments of the present invention and the image processing method according to the first and second embodiments of the present invention, the interpolation reliability may be calculated merely by integrating only the first interpolation reliability and the second interpolation reliability or only the first interpolation reliability and the third interpolation reliability. In such embodiments, when only the first interpolation reliability and the second interpolation reliability are integrated, such embodiments are realizable by setting the third interpolation reliability value in the first and second embodiments to a fixed value of 1.0. Alternatively, When only the first interpolation reliability and the third interpolation reliability are integrated, such embodiments are realizable by setting the second interpolation reliability value to a fixed value of 1.0.

In the method of integrating the first interpolation reliability and the second interpolation reliability and calculating an interpolated reliability, adding the second interpolation reliability calculated from the width of a search range allows using information about the easiness of for accurate interpolation execution held by the width of the search range. For that reason, the interpolation reliability can be calculated at high precision, compared with the conventional method of calculating the interpolation reliability based on interpolation difference values.

Moreover, in the method of integrating the first interpolation reliability and the third interpolation reliability and calculating an interpolated reliability, the third interpolation reliability calculated based on luminance change patterns of upper and lower lines within a search range is added so that information about easy execution of accurate interpolation can be obtained based on the complexity of luminance changes around interpolated pixels. For that reason, the interpolation reliability can be calculated at high precision, compared with the conventional method of calculating the interpolation reliability based on interpolation difference values.

In the embodiments described above, various units, such as the image interpolation means 21, the interpolation reliability calculation means 22 and 32, and others, are made up of hardware. However, various units may be made up of a computer, which runs under program control, belonging to any one of a central processing unit, a processor or a data processing unit.

The 1st mode of the present invention is characterized in that an image processing method comprising the step of: determining an interpolation reliability of interpolated pixels in a progressive image generated by interpolating an interlaced image, by integrating at least any of a first interpolation reliability, a second interpolation reliability, and a third interpolation reliability, said first interpolation reliability being determined based on difference absolute values between pixels on an upper line and pixels on a lower line, used to calculate pixel values to be interpolated, said second interpolation reliability being determined based on the width of an area used to determine pixels on an upper line and pixels on a lower line, used to calculate said pixel values to be interpolated, said third interpolation reliability being determined by combining a change in luminance of an upper line and a change in luminance of a lower line within said area.

The 2nd mode of the present invention, in the above-mentioned mode, is characterized in that the image processing method further comprising the step of: determining said interpolation reliability, by integrating said first interpolation reliability, said second interpolation reliability, and said third interpolation reliability.

The 3rd mode of the present invention, in the above-mentioned mode, is characterized in that the value of said first interpolation reliability increases with a decrease in said difference absolute value and decreases with an increase in said difference absolute value.

The 4th mode of the present invention, in the above-mentioned mode, is characterized in that the value of said second interpolation reliability increases with an increase in width of said area and decreases with a decrease in width of said area.

The 5th mode of the present invention, in the above-mentioned mode, is characterized in that said third interpolation reliability has a larger value when a pattern of a change in luminance of an upper line resembles a pattern of a change in luminance of a lower line.

The 6th mode of the present invention, in the above-mentioned mode, is characterized in that said third interpolation reliability has a larger value when a pattern of a change in luminance of said upper line and a pattern of a change in luminance of said lower line are simple and has a smaller value when a pattern of a change in luminance of said upper line and a pattern of a change in luminance of said lower line are complex.

The 7th mode of the present invention, in the above-mentioned mode, is characterized in that the image processing method further comprising the step of using four patterns as a pattern where a change in luminance of an upper line and a change in luminance of a lower line are combined in said area, said fourth patterns including one of said two luminance changes having a flat characteristic, said two luminance changes having characteristics of increasing or decreasing in the same direction, said two luminance changes having characteristics curved convexly in the same direction, and one of said two luminance changes having an increasing or decreasing characteristic but the other having a characteristic curved convexly.

The 8th mode of the present invention, in the above-mentioned mode, is characterized in that the image processing method comprising the step of: utilizing a synthesis weight coefficient to be input through a user interface when at least any of said first interpolation reliability, said second interpolation reliability, and said third interpolation reliability are integrated.

The 9th mode of the present invention is characterized in that an image processing method comprising: an image interpolation step for interpolating interlaced images and generating progressive images; at least any of a first interpolation reliability calculation step, a second interpolation reliability calculation step, and a third interpolation reliability calculation step, said first interpolation reliability calculation step calculating a first interpolation reliability of an interpolation pixel to be determined based on a difference absolute value between pixels of an upper line and pixels of a lower line used to calculate a pixel value to be interpolated, said second interpolation reliability calculation step calculating a second interpolation reliability of an interpolation pixel to be determined based on the width of an area used to determine pixels of an upper line and pixels of a lower line used to calculate said pixel value to be interpolated, said third interpolation reliability calculation step calculating a third interpolation reliability of an interpolation pixel to be determined based on a combination pattern a change in luminance of an upper line and a change in luminance of a lower line in said area, and an interpolation reliability integration step for integrating at least any of said first interpolation reliability, said second interpolation reliability, and said third interpolation reliability, and thus calculating the interpolation reliability of an interpolation pixel.

The 10th mode of the present invention, in the abovementioned mode, is characterized in that the image processing method according to claim 9, further comprising the step of: performing both said second interpolation reliability calculation step and said third interpolation reliability calculation step; and thus integrating said first interpolation reliability, said second interpolation reliability and said third interpolation reliability.

The 11th mode of the present invention is characterized in that an image processing apparatus comprising: at least any of a first interpolation reliability calculation means, a second interpolation reliability calculation means, and a third interpolation reliability calculation means, said first interpolation reliability calculation means calculating a first interpolation reliability of an interpolated pixel determined based on a difference absolute value between pixels of an upper line and pixels of a lower line, used to calculate an interpolated pixel value of a progressive image generated by interpolating an interlaced image, said second interpolation reliability calculation means calculating a second interpolation reliability of an interpolated pixel to be determined based on the width of an area used to determine pixels on an upper line and pixels on a lower line, used to calculate said interpolated pixel value, said third interpolation reliability calculation means calculating a third interpolation reliability of an interpolated pixel to be determined based on a combination pattern of a change in luminance on an upper line and a change in luminance on a lower line within said area; and an interpolation reliability integration means for integrating at least any of said first interpolation reliability, said second interpolation reliability, and said third interpolation reliability and thus calculating an interpolation reliability of an interpolated pixel.

The 12th mode of the present invention, in the abovementioned mode, is characterized in that the image processing apparatus further comprising said second interpolation reliability calculation means and said third interpolation reliability calculation means, and wherein said interpolation reliability integration means integrates said first interpolation reliability, said second interpolation reliability, and said third interpolation reliability.

The 13th mode of the present invention, in the abovementioned mode, is characterized in that said first interpolation reliability calculation means calculates said first interpolation reliability so as to has a larger value when said difference absolute value is small and has a smaller value when said difference absolute value is large.

The 14th mode of the present invention, in the abovementioned mode, is characterized in that said second interpolation reliability calculation means calculates said second interpolation reliability so as to has a larger value when said area is broad and has a smaller value when said area is narrow.

The 15th mode of the present invention, in the abovementioned mode, is characterized in that said third interpolation reliability calculation means calculates said third interpolation reliability so as to have a larger value when a luminance change pattern of an upper line resembles a luminance change pattern of a lower line.

The 16th mode of the present invention, in the abovementioned mode, is characterized in that said third interpolation reliability calculation means calculates said third interpolation reliability so as to has a larger value when a luminance change pattern of said upper line and a luminance change pattern of said lower line are simple and has a smaller value when a luminance change pattern of said upper line and said luminance change pattern of said lower line are complex.

The 17th mode of the present invention, in the abovementioned mode, is characterized in that said third interpolation reliability calculation means uses four patterns as a combination pattern of a luminance change of an upper line and a luminance change of a lower line in said area, said fourth patterns including one of said two lines having a flat characteristic, said two lines having characteristics decreasing or increasing in the same direction, said two lines having characteristics curved convexly in the same direction, and one of said two lines having a decreasing or increasing characteristic but the other having a characteristic curved convexly.

The 18th mode of the present invention, in the above-mentioned mode, is characterized in that said interpolation reliability integration means utilizes a synthesis weight coefficient input via a user interface when at least any of said first interpolation reliability, said second interpolation reliability, and said third interpolation reliability are integrated.

The 19th mode of the present invention is characterized in that a program directing an information processing apparatus to execute the process including: at least any of a first interpolation reliability calculation process, a second interpolation reliability calculation process, and a third interpolation reliability calculation process, said first interpolation reliability calculation process calculating a first interpolation reliability of an interpolated pixel to be determined based on a difference absolute value between pixels of an upper line and pixels of a lower line used to calculate an interpolated pixel value of a progressive image generated by interpolating an interlaced image, said second interpolation reliability calculation process calculating a second interpolation reliability of an interpolated image to be determined based on the width of an area used to determine pixels of an upper line and pixels of a lower line used to calculate said interpolated pixel value, said third interpolation reliability calculation process calculating a third interpolation reliability of an interpolated pixel to be determined based on a combination pattern of a luminance change of an upper line and a luminance change of a lower line in said area; and an interpolation reliability integration process for integrating at least any of said first interpolation reliability, said second interpolation reliability, and said third interpolation reliability, to calculate the interpolation reliability of an interpolation pixel.

The 20th mode of the present invention, in the above-mentioned mode, is characterized in that the program further comprising the process of: directing said information processing apparatus to execute both said second interpolation reliability calculation process and said third interpolation reliability calculation process; and integrating said first interpolation reliability, said second interpolation reliability, and said third interpolation reliability in said interpolation reliability integration process.

The 21st mode of the present invention, in the above-mentioned mode, is characterized in that said first interpolation reliability calculation process calculates said first interpolation reliability so as to has a larger value when said difference absolute value is small and has a smaller value when said difference absolute value is large.

The 22nd mode of the present invention, in the above-mentioned mode, is characterized in that said second interpolation reliability calculation process calculates said second interpolation reliability so as to has a larger value when said area is broad and has a smaller value when said area is narrow.

The 23rd mode of the present invention, in the above-mentioned mode, is characterized in that said third interpolation reliability calculation process calculates said third interpolation reliability so as to have a larger value when a luminance change pattern of an upper line resembles a luminance change pattern of a lower line.

The 24th mode of the present invention, in the above-mentioned mode, is characterized in that said third interpolation reliability calculation process calculates said third interpolation reliability so as to has a larger value when a luminance change pattern of said upper line and a luminance change pattern of said lower line is simple and has a smaller value when a luminance change pattern of said upper line and a luminance change pattern of said lower line is complex.

The 25th mode of the present invention, in the above-mentioned mode, is characterized in that said third interpolation reliability calculation process uses four patterns as a combination pattern of a luminance change of an upper line and a luminance change of a lower line in said area, said fourth patterns including one of said two lines having a flat characteristic, said two lines having characteristics decreasing or increasing in the same direction, said two lines having characteristics curved convexly in the same direction, and one of said two lines having a decreasing or increasing characteristic but the other having a characteristic curved convexly.

The 26th mode of the present invention, in the above-mentioned mode, is characterized in that said interpolation reliability integration process utilizes a synthesis weight coefficient input via a user interface when at least any of said first interpolation reliability, said second interpolation reliability, and said third interpolation reliability are integrated.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the sprit and scope of the invention.

This application is based upon and claims the benefit of priority from Japanese patent application No. 2008-72972, filed on Mar. 21, 2008, the disclosure of which is incorporated herein in its entirety by reference.

[Industrial Applicability]

The present invention is applicable suitably as image processing apparatuses in various image processing applications, which utilize progressive images generated through the interlace-to-progressive conversion.

[EXPLANATION OF SYMBOLS]

| | |
|---|---|
| 100 | Image processing apparatus in a conventional technique |
| 11 | Image interpolation means |
| 12 | Interpolation reliability calculation means |
| 200 | Image processing apparatus in a first embodiment according to the present invention |
| 21 | Image interpolation means |
| 22 | Interpolation reliability calculation means |
| 221 | First interpolation reliability calculation means |
| 222 | Second interpolation reliability calculation means |
| 223 | Third interpolation reliability calculation means |
| 224 | Interpolation reliability integration means |
| 300 | Image processing apparatus in a second embodiment according to the present invention |
| 32 | Interpolation reliability calculation means |
| 324 | Interpolation reliability integration means |
| 400 | Image processing applied apparatus |
| 500 | User interface |

The invention claimed is:

1. An image processing method comprising:
   determining an interpolation reliability of interpolated pixels in a progressive image generated by interpolating an interlaced image, by integrating
   a first interpolation reliability, said first interpolation reliability being determined based on difference absolute values between pixels on an upper line and pixels on a lower line, used to calculate pixel values to be interpolated,
   a second interpolation reliability, said second interpolation reliability being determined based on the width of an area used to determine pixels on an upper line and pixels on a lower line, used to calculate said pixel values to be interpolated, and a third interpolation reliability, the third interpolation reliability being determined based on four patterns used as a pattern in which a change in luminance of an upper line and a chance in luminance of a lower line are combined in the area, the four patterns including one of the two luminance changes having a flat characteristic, the two luminance changes having characteristics of increasing or decreasing in a same direction, the two luminance changes having characteristics curved convexly in the same direction, and one of the two luminance changes having an increasing or decreasing characteristic, the other of the two luminance changes having a characteristic curved convexly.

2. The image processing method according to claim 1, wherein the value of said first interpolation reliability increases with a decrease in said difference absolute value and decreases with an increase in said difference absolute value.

3. The image processing method according to claim 1, wherein the value of said second interpolation reliability increases with an increase in width of said area and decreases with a decrease in width of said area.

4. The image processing method according to claim 1, wherein said third interpolation reliability has a larger value when a pattern of a change in luminance of an upper line resembles a pattern of a change in luminance of a lower line.

5. The image processing method according to claim 1, comprising:
utilizing a synthesis weight coefficient to be input through a user interface when at least any of said first interpolation reliability, said second interpolation reliability, and said third interpolation reliability are integrated.

6. The image processing method according to claim 1, wherein said third interpolation reliability has a smaller value in an order of a pattern including one of the two luminance changes having a flat characteristic, a pattern including the two luminance changes having characteristics of increasing or decreasing in the same direction, a pattern including the two luminance changes having characteristics curved convexly in the same direction, and a pattern having one of the two luminance changes having an increasing or decreasing characteristic but the other having a characteristic curved convexly.

7. An image processing method comprising:
interpolating interlaced images and generating progressive images;
calculating a first interpolation reliability of an interpolation pixel determined based on a difference absolute value between pixels of an upper line and pixels of a lower line used to calculate a pixel value to be interpolated;
calculating a second interpolation reliability of the interpolation pixel determined based on the width of an area used to determine pixels of an upper line and pixels of a lower line used to calculate said pixel value to be interpolated;
calculating a third interpolation reliability of the interpolation pixel to be determined based on four patterns used as a pattern in which a change in luminance of an upper line and a chance in luminance of a lower line are combined in the area, the four patterns including one of the two luminance changes having a flat characteristic, the two luminance changes having characteristics of increasing or decreasing in a same direction, the two luminance changes having characteristics curved convexly in the same direction, and one of the two luminance changes having an increasing or decreasing characteristic, the other of the two luminance changes having a characteristic curved convexly; and
integrating said first interpolation reliability, said second interpolation reliability, and said third interpolation reliability, and thus calculating the interpolation reliability of the interpolation pixel.

8. An image processing apparatus comprising:
a first interpolation reliability calculator calculating a first interpolation reliability of an interpolated pixel determined based on a difference absolute value between pixels of an upper line and pixels of a lower line, used to calculate an interpolated pixel value of a progressive image generated by interpolating an interlaced image;
a second interpolation reliability calculator calculating a second interpolation reliability of the interpolated pixel determined based on the width of an area used to determine pixels on an upper line and pixels on a lower line, used to calculate said interpolated pixel value;
a third interpolation reliability calculator calculating a third interpolation reliability of the interpolation pixel to be determined based on four patterns used as a pattern in which a change in luminance of an upper line and a chance in luminance of a lower line are combined in the area, the four patterns including one of the two luminance changes having a flat characteristic, the two luminance changes having characteristics of increasing or decreasing in a same direction, the two luminance changes having characteristics curved convexly in the same direction, and one of the two luminance changes having an increasing or decreasing characteristic, the other of the two luminance changes having a characteristic curved convexly; and
an interpolation reliability integration unit that integrates said first interpolation reliability, said second interpolation reliability, and said third interpolation reliability, and thus calculates an interpolation reliability of the interpolated pixel.

9. The image processing apparatus according to claim 8, wherein said first interpolation reliability calculator calculates said first interpolation reliability such that a value of the first interpolation reliability increases as said difference absolute value decreases.

10. The image processing apparatus according to claim 8, wherein said second interpolation reliability calculator calculates said second interpolation reliability such that a value of the second interpolation reliability increases as the width of said area increases.

11. The image processing apparatus according to claim 8, wherein said third interpolation reliability calculator calculates said third interpolation reliability so as to have a larger value when a luminance change pattern of an upper line resembles a luminance change pattern of a lower line.

12. The image processing apparatus according to claim 8, wherein said interpolation reliability integration unit utilizes a synthesis weight coefficient input via a user interface when at least any of said first interpolation reliability, said second interpolation reliability, and said third interpolation reliability are integrated.

13. The image processing apparatus according to claim 8, wherein said third interpolation reliability calculator calculates said third interpolation reliability so as to have a smaller value in an order of a pattern including one of the two luminance changes having a flat characteristic, a pattern including the two luminance changes having characteristics of increasing or decreasing in the same direction, a pattern including the two luminance changes having characteristics curved convexly in the same direction, and a pattern having one of the two luminance changes having an increasing or decreasing characteristic but the other having a characteristic curved convexly.

14. A non-transitory computer readable storage medium storing a program directing an information processing apparatus to execute the method comprising:
  calculating a first interpolation reliability of an interpolated pixel determined based on a difference absolute value between pixels of an upper line and pixels of a lower line used to calculate an interpolated pixel value of a progressive image generated by interpolating an interlaced image;
  calculating a second interpolation reliability of an interpolated image determined based on the width of an area used to determine pixels of an upper line and pixels of a lower line used to calculate said interpolated pixel value;
  calculating a third interpolation reliability of the interpolation pixel to be determined based on four patterns used as a pattern in which a change in luminance of an upper line and a chance in luminance of a lower line are combined in the area, the four patterns including one of the two luminance changes having a flat characteristic, the two luminance changes having characteristics of increasing or decreasing in a same direction, the two luminance changes having characteristics curved convexly in the same direction, and one of the two luminance changes having an increasing or decreasing characteristic, the other of the two luminance changes having a characteristic curved convexly; and
  integrating said first interpolation reliability, said second interpolation reliability, and said third interpolation reliability to calculate the interpolation reliability of the interpolation pixel.

15. The non-transitory computer readable storage medium storing a program according to claim 14, wherein said first interpolation reliability is calculated such that a value of the first interpolation reliability increases as said difference absolute value decreases.

16. The non-transitory computer readable storage medium storing a program according to claim 14, wherein said second interpolation reliability is calculated such that a value of the second interpolation reliability increases as the width of said area increases.

17. The non-transitory computer readable storage medium storing a program according to claim 14, wherein said third interpolation reliability is calculated so as to have a larger value when a luminance change pattern of an upper line resembles a luminance change pattern of a lower line.

18. The non-transitory computer readable storage medium storing a program according to claim 14, wherein the integrating said interpolation reliability utilizes a synthesis weight coefficient input via a user interface when at least any of said first interpolation reliability, said second interpolation reliability, and said third interpolation reliability are integrated.

19. The non-transitory computer readable storage medium storing a program according to claim 14, wherein said third interpolation reliability is calculated so as to have a smaller value in an order of a pattern including one of the two luminance changes having a flat characteristic, a pattern including the two luminance changes having characteristics of increasing or decreasing in the same direction, a pattern including the two luminance changes having characteristics curved convexly in the same direction, and a pattern having one of the two luminance changes having an increasing or decreasing characteristic but the other having a characteristic curved convexly.

* * * * *